United States Patent
Loeffler (10) Patent No.: US 6,746,367 B2
(45) Date of Patent: Jun. 8, 2004

(54) METHOD AND DEVICE FOR CONTROLLING THE DRIVETRAIN OF A MOTOR VEHICLE DURING GEARSHIFT OPERATIONS

(75) Inventor: Juergen Loeffler, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/110,298

(22) PCT Filed: Jul. 28, 2001

(86) PCT No.: PCT/DE01/02868

§ 371 (c)(1), (2), (4) Date: Aug. 15, 2002

(87) PCT Pub. No.: WO02/12013

PCT Pub. Date: Feb. 14, 2002

(65) Prior Publication Data

US 2003/0040402 A1 Feb. 27, 2003

(30) Foreign Application Priority Data

Aug. 10, 2000 (DE) .......................................... 100 39 084

(51) Int. Cl.$^7$ ................................................ B60K 41/28
(52) U.S. Cl. ........................ 477/70; 477/77; 701/58
(58) Field of Search .............................. 477/70, 73, 74, 477/77, 83, 86, 90; 701/53, 54, 58; B60K 41/28

(56) References Cited

U.S. PATENT DOCUMENTS

| | | | | |
|---|---|---|---|---|
| 4,558,772 A | * | 12/1985 | Grimes et al. ............... | 477/176 |
| 4,646,891 A | * | 3/1987 | Braun ......................... | 477/175 |
| 4,874,070 A | * | 10/1989 | Nellums et al. .............. | 477/84 |
| 5,427,215 A | | 6/1995 | Jarvis | |
| 5,983,153 A | * | 11/1999 | Poljansek .................... | 701/51 |
| 6,012,009 A | * | 1/2000 | Kronenberg et al. .......... | 701/56 |
| 6,038,505 A | * | 3/2000 | Probst et al. ................. | 701/65 |
| 6,125,314 A | * | 9/2000 | Graf et al. .................... | 701/53 |
| 6,188,945 B1 | * | 2/2001 | Graf et al. .................... | 701/58 |

FOREIGN PATENT DOCUMENTS

| | | |
|---|---|---|
| DE | 196 25 935 | 1/1998 |
| DE | 197 25 816 | 1/1998 |
| DE | 197 03 863 | 8/1998 |
| DE | 199 37 455 | 4/2000 |
| EP | 0 695 665 | 2/1996 |

OTHER PUBLICATIONS de Boor, C.: "A Practical Guide to Splines. Applied Mathematical Sciences", vol. 27, Springer–Verlag, New York 1978. Chapter on spline interpolation.

* cited by examiner

Primary Examiner—Rodney H. Bonck
Assistant Examiner—David D. Le
(74) Attorney, Agent, or Firm—Kenyon & Kenyon (57) ABSTRACT

A coordinated control of a drive train during a gear shift is described. The core of the control lies in establishing an optimal system trajectory for the states of the internal combustion engine and the clutch for the shift operation and in supplying this trajectory to a subordinate control and regulation. Here, the determination of the optimal system trajectory occurs as a function of the stipulations of a higher-order system for controlling the drive train. In particular, it is provided for the optimal system trajectory to be adapted to the driving situation, the driver type, the operating conditions of the assemblies, and the state of the assemblies themselves. Here, the determination of the optimal system trajectory occurs via a real-time optimization algorithm that is executed during driving operation. In this manner, optimal shift operation is attained under all operating conditions that unites a high degree of comfort with a low loss of traction.

9 Claims, 5 Drawing Sheets

METHOD AND DEVICE FOR CONTROLLING THE DRIVETRAIN OF A MOTOR VEHICLE DURING GEARSHIFT OPERATIONS

FIELD OF THE INVENTION

The present invention relates to a method and device for controlling the drive train of a motor vehicle during gear shift operations.

BACKGROUND INFORMATION

In vehicles having an automated gear box and an electronically actuated clutch, an automated gear change occurs by triggering the internal combustion engine, clutch, and transmission components. These components must be actuated appropriately such that the gear change occurs as quickly and therefore as comfortably as possible.

Conventional methods for determining the target transmission gear which, besides the direct input variables, also take into account the driving situation, the driver type, and operating conditions when determining the gear. These methods are described in, for example, German Published Patent Application No. 196 25 935 or German Published Patent Application No. 197 03 863.

Moreover, systems for coordinated drive train control are conventional. German Published Patent Application No. 199 37 455 describes a system for controlling the assemblies in gear shift operations that is embedded in a system for controlling the drive train.

However, the conventional methods do not guarantee an optimal control of the shift operation with regard to traction and comfort while taking into account the driving situation, driver type, and operating conditions.

An object of the present invention is to provide an optimal control of the assemblies of the drive train during gear shift operations with regard to traction and comfort under all operating conditions.

SUMMARY

As described above, the present invention relates to the coordinated control of the elements servo clutch, vehicle engine, and transmission arranged in the drive train of a motor vehicle during a change in the gear ratio. In accordance with the present invention, temporal progressions of the states of the vehicle engine and the servo clutch may be established for the change in gear ratio. The control of the servo clutch and the vehicle engine during the change in gear ratio then may occur in such a manner that the servo clutch and the vehicle engine assume the states according to the established temporal progressions.

Thus, according to the present invention, an optimal system trajectory for the shift operation may be determined for the conditions of the internal combustion engine and the clutch and this trajectory may be supplied to a subordinate control and regulation. The determination of the optimal system trajectory may occur in this connection as a function of the stipulations of a higher-order system for controlling the drive train.

According to an example embodiment of the present invention, provision is made that, during driving operation of the vehicle, at least

- one driver type value representative of the behavior of the driver of the vehicle and/or
- one driving situation value representative of the instantaneous driving situation and/or
- one operating state value representative of the operating state of at least one element of the drive train and/or
- one operating condition value representative of at least one operating condition of at least one element of the drive train is calculated. The temporal progressions may then be determined dependent upon at least one of the calculated values. Thus, it may also be provided according to the present invention for the optimal system trajectory to be adapted to the driving situation, driver type, operating conditions of the assemblies and the state of the assemblies themselves.

The determination of the optimal system trajectory may occur via a real-time optimization algorithm that may be executed during driving operation. This means that the temporal progressions may be calculated and updated during driving operation. At the beginning of a change in the gear ratio, the respective updated progressions may then be established as the progressions according to which the control of the servo clutch and of the vehicle engine occurs during the change in the gear ratio.

In particular, a result of this algorithm may include the target progression of the engine speed and the target progression of the clutch output torque. This means that the output speed of the vehicle engine may be set as the state of the vehicle engine and the output torque of the servo clutch may be set as the state of the servo clutch.

Using the present invention, optimal shift operation may be attained under all operating conditions that may provide a high degree of comfort with a low loss of traction.

DETAILED DESCRIPTION

The invention is be described below with reference to example embodiments.

Figure 1:
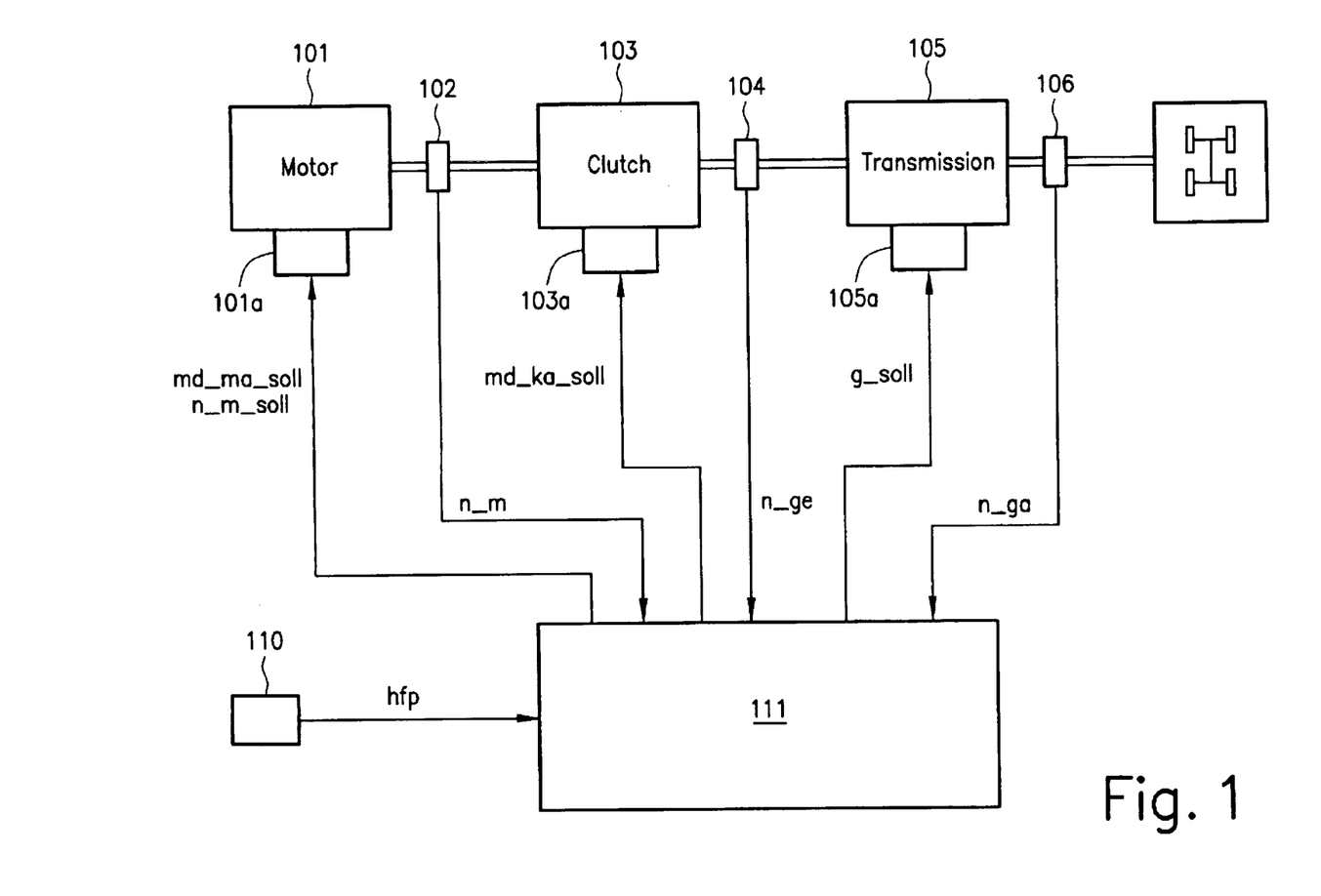
FIG. 1 is a schematic top view of the present invention.

Using a drive train control, in a vehicle with an automated gear box (AGB) and electronically actuated clutch, the change of gears occurs via coordinator 111 of the components engine, clutch, and transmission. FIG. 1 illustrates the system architecture of the drive train control.

The driving torque desired by the driver is calculated by coordinator 111 as a function of relative position hfp of accelerator 110 and transmission output speed n_ga proportional to the vehicle speed. Output engine torque md_ma_soll or the setting of an engine speed n_m_soll is requested by engine control 101a. Clutch control 103a is requested to adjust the clutch in such a manner that it is able to transfer a torque md_ka_soll. Alternatively, it is also possible for the stipulation of a target position or target force of the actuator that actuates automated clutch 103 to be provided.

Transmission control device 105a is requested by coordinator 111 to set target transmission gear g_soll.

Using appropriate sensors 102, 104, and 106, engine speed n_m, transmission input speed n_ge, and transmission output speed n_ga are determined and provided to coordinator 111. Moreover, control components 101a, 103a, and 105a provide further signals to coordinator 111 that will be clarified in conjunction with the functional structure of the drive train control.

Figure 2:
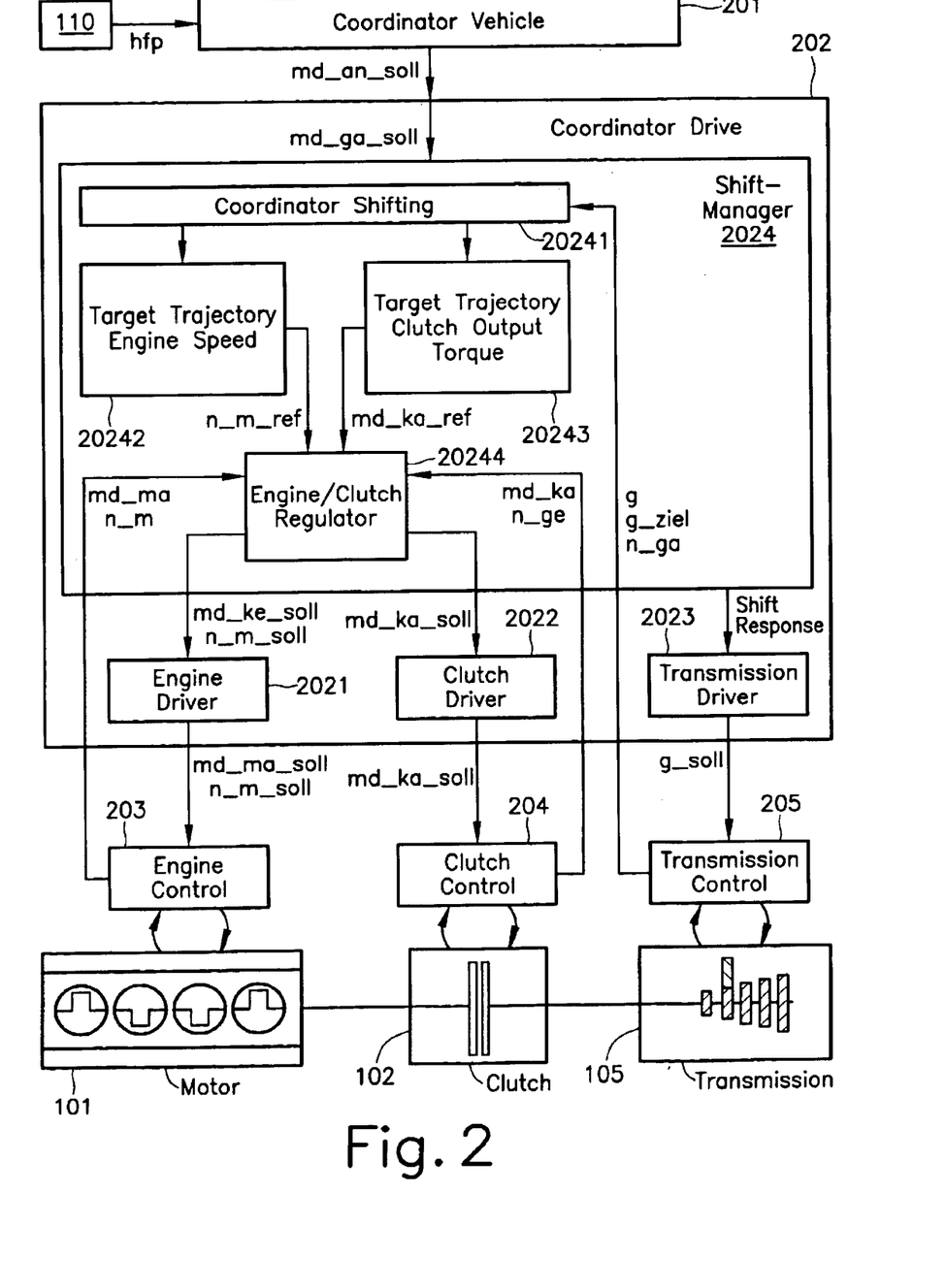
FIG. 2 illustrates the present invention embedded in a system for controlling the drive train.

FIG. 2 illustrates the present invention embedded in a system for controlling the drive train. As a function of the position of accelerator hpf and transmission output speed n_ga proportional to the vehicle speed, vehicle coordinator 201 determines target drive power md_an_soll. This target drive performance is converted by drive coordinator 202 by triggering the assemblies engine 101, clutch 103, and transmission 105. For this purpose, it provides target engine output torque md_ma_soll and target engine speed n_m_soll to engine control 203. Drive coordinator 202 also provides torque md_ka_soll to clutch control 204, which clutch 103 may be able to transmit. Target gear g_soll is specified by transmission control 205.

A driver (engine driver 2021, clutch driver 2022, transmission driver 2023) is assigned to each of assemblies 101, 103, and 105 within drive coordinator 202. The coordinated actuation of assemblies 101, 103, and 105 during gear shift operations is performed by shift manager 2024, which is part of drive coordinator 202 and provides target variables to drivers 2021, 2022, and 2023 during shifting. Shift manager 2024 requests a target clutch input torque md_ke_soll and/or a target engine speed n_m_soll from engine driver 2021. Shift manager 2024 also requests the setting of a clutch torque md_ka_soll from clutch driver 2022 and is able to request a shifting prohibition from transmission driver 2023.

Within shift manager 2024, an engine/clutch regulator 20244 ensures coordinated control and regulation of engine 101 and clutch 102. It receives the target progression of engine speed n_m_ref from a target trajectory block for engine speed 20242.

It also receives the target progression of clutch output torque md_ka_ref from a target trajectory block for clutch output torque 20243. A shifting coordinator block 20241 is responsible for the coordination of the specifications.

Figure 3:
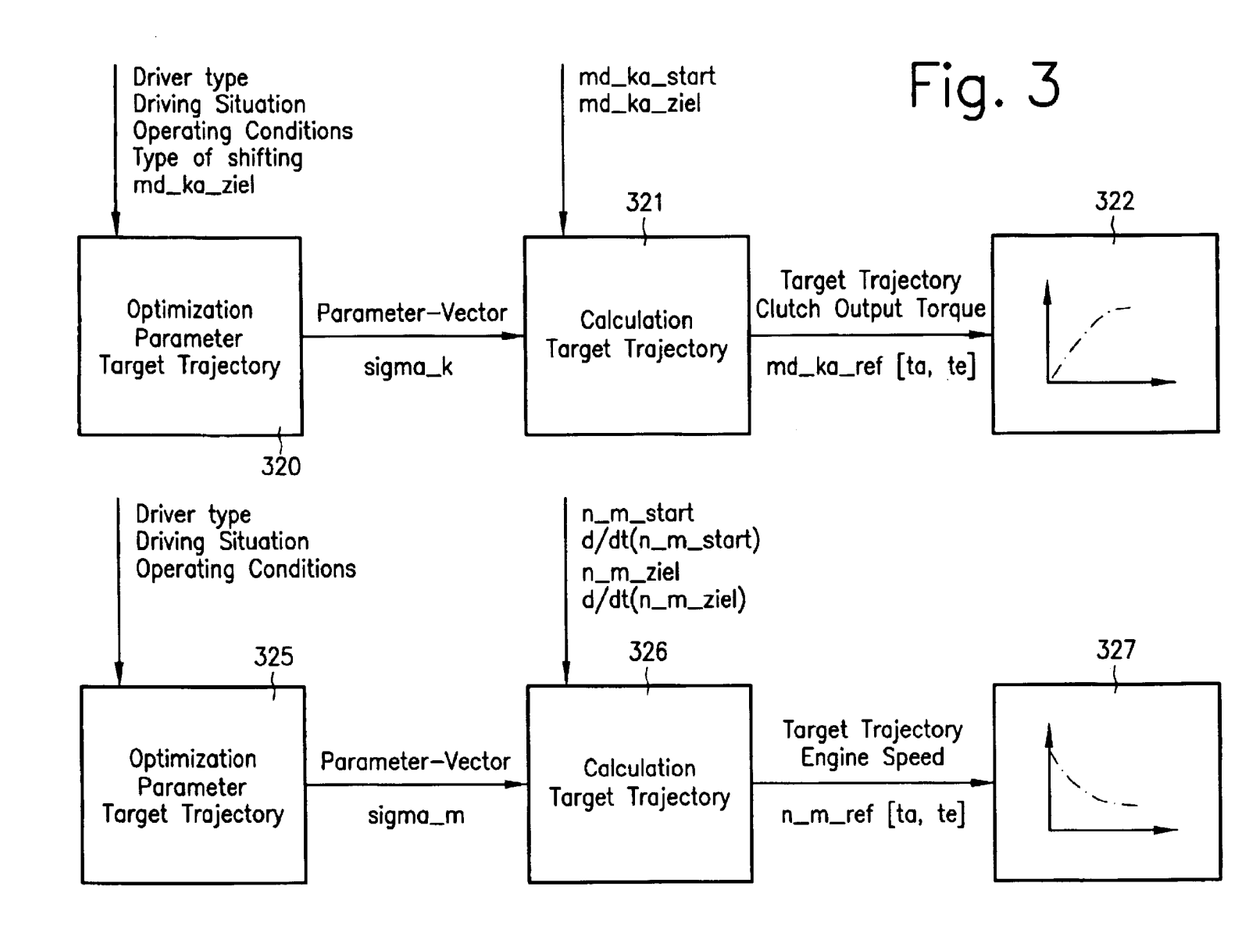
FIG. 3 illustrates details of the shifting coordination.

Based on a block diagram, FIG. 3 illustrates the method for determining target trajectories 20242 and 20243 for the clutch output torque and the engine speed that is attained within the arithmetic block for shifting coordinator 20241.

In order to calculate the target trajectory for clutch output torque md_ka_ref, information is provided to block 320 (optimization of target trajectory parameter) about the driver type, driving situation, and operating conditions as well as the shifting type and the desired target value for the clutch output torque at the end of shifting phase md_ka_ziel. The shifting type provides coded information regarding the shifting, for example, 1–2 pull shift (changing from first gear to second gear while the engine is driving the vehicle), 4-3 push shift (changing from fourth gear to third gear while the vehicle is driving the engine). These input variables are provided to block 320 by shifting coordinator 20241 and/or by drive coordinator 202. The calculation of values that the driver type. (e.g., "sporty" or "economy"), the driving situation (e.g., mountain driving, winter driving), and the operating conditions of the assemblies (e.g., temperature of the engine and/or clutch) may be calculated in a conventional manner.

In block 320, parameter vector sigma_k, which establishes the characteristics of target trajectory md_ka_ref, is determined from this information. In particular, the elements of vector sigma_k describe the shape of target trajectory md_ka_ref (e.g., linear, PT1-shaped, sinusoid) and its duration (and thus the time interval {ta, te}). The mapping of the input information from block 320 on parameter vector sigma_k may occur via algebraic calculation specifications, characteristic curves, characteristic maps, fuzzy rules, or neuronal networks, optionally also based on a model description of the drive assemblies and the vehicle.

In block 321 (calculation of target trajectory), target trajectory md_ka_ref is calculated. The output of block 321 is a depiction of the target trajectory as a characteristic curve over time interval {ta, te}. In addition to parameter vector sigma_k, the initial value of clutch output torque md_ka_start and the desired target value for clutch output torque md_ka_ziel at the end of the shift phase are input variables of block 321.

In order to calculate the target trajectory for engine speed n_m_ref, information is provided to block 325 (optimization of target trajectory parameter) regarding the driver type, driving situation, and operating conditions. Using this information, it determines a parameter vector sigma_m that establishes the characteristics of target trajectory n_m_ref. The elements of vector sigma_m in particular describe the shape of target trajectory n_m_ref (e.g., linear, PT1-shaped, sinusoid). The mapping of the input information of block 325 on parameter vector sigma_m may occur via algebraic calculation specifications, characteristic curves, characteristic maps, fuzzy rules, or neuronal networks, optionally also based on a model description of the drive assemblies and the vehicle.

In block 326 (calculation of target trajectory), target trajectory n_m_ref is calculated. The output of block 326 is a depiction of the target trajectory as a characteristic curve over time interval {ta, te}. In addition to parameter vector sigma_m, the initial value of engine speed n_m_start, the gradient of engine speed d/dt(n_m_start), the target value of engine speed n_m_ziel and its gradient d/dt(n_m_ziel) are input variables of block 326.

The calculation of the target trajectories for the clutch output torque and/or the engine speed in arithmetic blocks 321 and 326 occurs using pre-defined mathematical functions such as, for example, a linear, exponential, or sinusoid function.

Figure 4A:
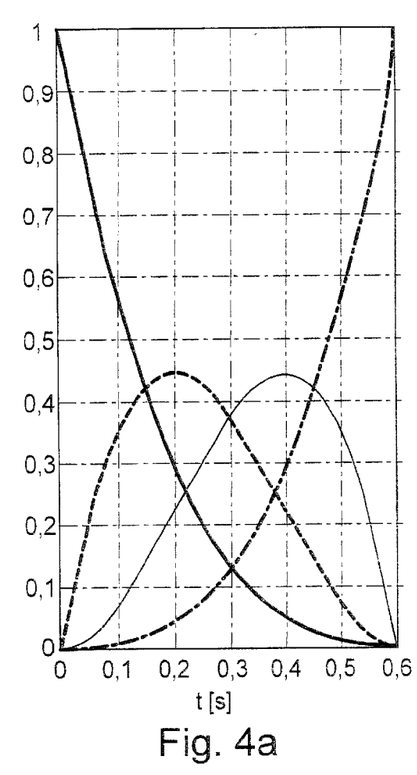
FIGS. 4a and 4b illustrate examples of the calculation according to the present invention of the temporal progressions.

In an example embodiment of the present invention, spline functions are used to determine the target trajectories for the clutch output torque and/or the engine speed. For example, the description of the progression of engine speed n_m_ref is illustrated using spline functions in FIGS. 4a and 4b and the description of target clutch output torque md_ka_ref is illustrated; using spline functions in FIGS. 5a and 5b.

Figure 4B:
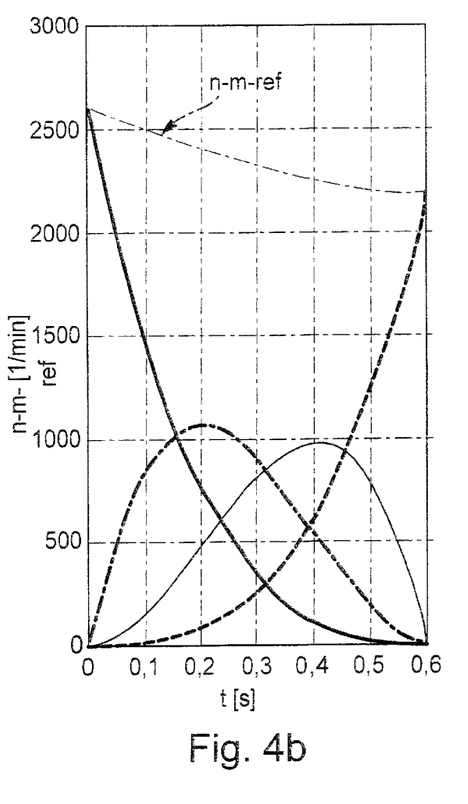
Figure 5A:
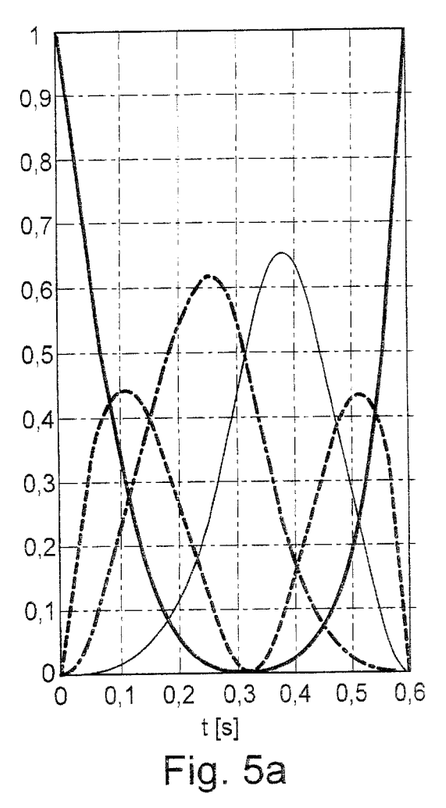
FIGS. 5a and 5b illustrate examples of the calculation according to the present invention of the temporal progressions.

In order to calculate the target trajectory for the engine speed in block 326, in a first step, the number of the spline base functions (B-splines) and their order as well as their distribution over time interval {ta, te} are established. This occurs as a function of parameter vector sigma_m. Correspondingly, in FIG. 4a, four base functions of the order 4 are illustrated. Using these base functions, the target progression of the engine speed is described in such a manner that the initial value of engine speed n_m_start, the gradient of engine speed d/dt(n_m_start), the target value of engine speed n_m_ziel, and its gradient d/dt(n_m_ziel) are satisfied (FIG. 4b). For this purpose, a method for spline interpolation is used that is described, for example, in de Boor, C.: A Practical Guide to Splines. Applied Mathematical Sciences, Vol. 27, Springer-Verlag, New York, 1978. Chapter on spline interpolation.

Figure 5B:
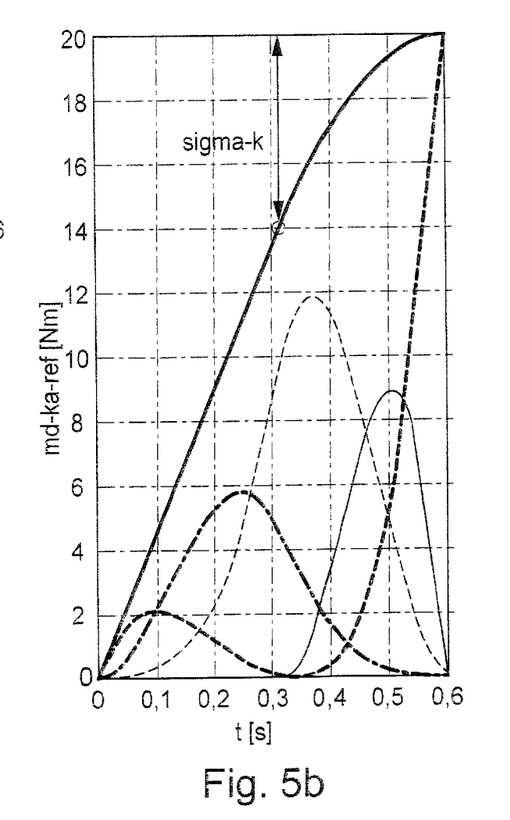

In order to calculate the target trajectory for the clutch output torque in block 321, in a first step, the number of spline base functions (B-splines) and their order as well as their distribution over time interval {ta, te} are established. This occurs as a function of parameter vector sigma_k. In the example, it was defined using parameter vector sigma_k that the first 70% of the torque build-up may occur in a linear manner. Correspondingly, in FIG. 5a, 6 base functions of the order 4 are illustrated. Using these base functions, the target progression of the clutch output torque is described in such a manner that, beginning from an initial value md_ka_start, the torque reaches target value md_ka_ziel (FIG. 5b).

What is claimed is:

1. A method for coordinated control of a servo clutch, a vehicle engine and a transmission arranged in a drive train of a motor vehicle during a change in a gear ratio, comprising the steps of:

establishing temporal progressions of states of the vehicle engine and the servo clutch for the change in the gear ratio;

controlling the servo clutch and the vehicle engine during the change in the gear ratio so that the servo clutch and the vehicle engine assume the states according to the temporal progressions established in the establishing steps;

calculating and updating the temporal progressions during a driving operation; and establishing at a beginning of the change in the gear ratio the updated temporal progressions as the progressions according to which control of the servo clutch and the vehicle engine occurs during the change in the gear ratio.

2. The method according to claim 1, wherein the establishing step includes the substeps of:

establishing an output speed of the vehicle engine as the state of the vehicle engine; and establishing an output torque of the servo clutch as the state of the servo clutch.

3. The method according to claim 1, further comprising the step of calculating during a driving operation of the vehicle at least one of:

a driver type value representative of a behavior of a driver of the vehicle;

a driving situation value representative of an instantaneous driving situation;

an operating state value representative of an operating state of at least one element of the drive train; and an operating condition value representative of at least one operating condition of the at least one element of the drive train;

wherein the temporal progressions are established in the establishing step in accordance with at least one of the calculated values.

4. The method according to claim 1, wherein the temporal progressions are calculated during the driving operation in accordance with a real-time optimization algorithm.

5. A device for coordinated control of a servo clutch, a vehicle engine and a transmission arranged in a drive train of a motor vehicle during a change in a gear ratio, comprising:

a coordination arrangement configured to establish temporal progressions of states of the vehicle engine and the servo clutch for the change in the gear ratio, the coordination arrangement further configured to so that control of the servo clutch and the vehicle engine during the change in the gear ratio occurs according to the established temporal progressions;

wherein the coordination arrangement is further configured to calculate and update the temporal progressions and to establish at a beginning of the change in the gear ratio the respective updated progressions as the progressions according to which control of the servo clutch and the vehicle engine occurs during the change in the gear ratio.

6. device according to claim 5, wherein the coordination arrangement is configured to establish an output speed of the vehicle engine as the state of the vehicle engine and to establish an output torque of the servo clutch as the state of the servo clutch.

7. The device according to claim 5, wherein the coordination arrangement is configured to calculate during a driving operation of the vehicle at least one of:

a driver type value representative of a behavior of a driver of the vehicle, a driving situation value representative of an instantaneous driving situation, an operating state value representative an of operating state of at least one element of the drive train, and an operating condition value representative of at least one operating condition of the at least one element of the drive train; and wherein the coordination arrangement is configured to determine the temporal progressions in accordance with at least one calculated value.

8. The device according to claim 5, wherein the coordination arrangement is configured to calculate the temporal progressions during the driving operation in accordance with a real-time optimization algorithm.

9. A device for coordinated control of a servo clutch, a vehicle engine and a transmission arranged in a drive train of a motor vehicle during a change in a gear ratio, comprising:

coordination means for establishing temporal progressions of states of the vehicle engine and the servo clutch for the change in gear ratio;

wherein control of the servo clutch and the vehicle engine occurs so that the servo clutch and the vehicle engine assume the states according to the established temporal progressions; and wherein the coordination means is configured to calculate and update the temporal progressions and to establish at a beginning of the change in the gear ratio the respective updated progressions as the progressions according to which control of the servo clutch and the vehicle engine occurs during the change in the gear ratio.

* * * * *

UNITED STATES PATENT AND TRADEMARK OFFICE
CERTIFICATE OF CORRECTION

PATENT NO. : 6,746,367 B2
DATED : June 8, 2004
INVENTOR(S) : Juergen Loeffler

It is certified that error appears in the above-identified patent and that said Letters Patent is hereby corrected as shown below:

Title page,
Item [57], ABSTRACT,
Line 1, change "A coordinated control" to -- In a coordinated control --;
Lines 1-2, change "is described. The core of the control lies in establishing" to -- , --;
Line 3, change "trajectory for the" to -- trajectory is established for the --,
Line 4, change "the shift operation" to -- the shift operation, --; and change "under all operating conditions" to -- under a plurality operating conditions --;
Line 5, change "in supplying this trajectory" to -- this trajectory is supplied --;
Lines 6 and 12, change "Here, the determination" to -- The determination --;
Line 15, change "optimal shift operation" to -- an optimal shift operation --;

Column 2,
Line 48, change "device 105$a$is" to -- device 105$a$ is -- and
Line 48, change "is illustrated; using" to -- is illustrated using --.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,746,367 B2 Page 1 of 1
DATED : June 8, 2004
INVENTOR(S) : Juergen Loeffler

It is certified that error appears in the above-identified patent and that said Letters Patent is hereby corrected as shown below:

Column 2,
Line 66, change "device 105*a*is" to -- device 105*a* is -- and

Column 4,
Line 52, change "is illustrated; using" to -- is illustrated using --.

Signed and Sealed this

Second Day of August, 2005

JON W. DUDAS
*Director of the United States Patent and Trademark Office*